US012580187B2

(12) United States Patent
Takeda et al.

(10) Patent No.: US 12,580,187 B2
(45) Date of Patent: Mar. 17, 2026

(54) LITHIUM ION BATTERY

(71) Applicant: Panasonic Intellectual Property Management Co., Ltd., Osaka (JP)

(72) Inventors: Nanami Takeda, Osaka (JP); Yukihiro Oki, Osaka (JP); Kazuko Asano, Osaka (JP); Mitsuhiro Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

(21) Appl. No.: 17/915,055

(22) PCT Filed: Mar. 30, 2021

(86) PCT No.: PCT/JP2021/013499
§ 371 (c)(1),
(2) Date: Sep. 27, 2022

(87) PCT Pub. No.: WO2021/200924
PCT Pub. Date: Oct. 7, 2021

(65) Prior Publication Data
US 2023/0163285 A1     May 25, 2023

(30) Foreign Application Priority Data
Apr. 2, 2020     (JP) ................................. 2020-066991

(51) Int. Cl.
H01M 4/38 (2006.01)
H01M 4/62 (2006.01)
(Continued)

(52) U.S. Cl.
CPC ........... H01M 4/387 (2013.01); H01M 4/622 (2013.01); H01M 10/0525 (2013.01); *H01M 2004/021* (2013.01); *H01M 2004/027* (2013.01)

(58) Field of Classification Search
None
See application file for complete search history.

(56) References Cited

U.S. PATENT DOCUMENTS

2005/0214643 A1     9/2005  Matsuno et al.
2007/0054189 A1*    3/2007  Matsuno ............... H01M 4/381
                                                        429/220
(Continued)

FOREIGN PATENT DOCUMENTS

JP     2005-100773 A     4/2005
JP     2005-310739 A     11/2005
(Continued)

OTHER PUBLICATIONS

Machine Translation of Japanese Publication No. 2005100773 (Year: 2005).*
(Continued)

*Primary Examiner* — Wyatt P McConnell
(74) *Attorney, Agent, or Firm* — WHDA, LLP

(57)     ABSTRACT

This lithium ion battery comprises a positive electrode having a positive electrode mixture layer that contains a positive electrode active material, and a negative electrode having a negative electrode mixture layer that contains a negative electrode active material; and this lithium ion battery is charged and discharged by the movement of lithium ions between the positive electrode and the negative electrode. The negative electrode mixture layer contains a negative electrode active material that is represented by general formula M3Me2X7 (wherein M contains at least one element of La, Ce, Ba, Sr, Zr, Ca, Mg and Y; Me contains at least one element of Ti, V, Cr, Nb, Mn, Ni, Fe, Co and Cu; and X contains at least one element of Ge, Si, Sn, Al, P, Sb and B), and a binder that contains ammonium carboxymethyl cellulose (NH4-CMC).

8 Claims, 4 Drawing Sheets

(51) Int. Cl.
  *H01M 10/0525* (2010.01)
  *H01M 4/02* (2006.01)

(56) References Cited

U.S. PATENT DOCUMENTS

| | | |
|---|---|---|
| 2007/0224510 A1 | 9/2007 | Yamamoto et al. |
| 2016/0111700 A1 | 4/2016 | Ikenuma et al. |
| 2023/0100030 A1 | 3/2023 | Asano et al. |

FOREIGN PATENT DOCUMENTS

| | | |
|---|---|---|
| JP | 2007-073215 A | 3/2007 |
| JP | 2007-258127 A | 10/2007 |
| JP | 4127692 B2 | 7/2008 |
| JP | 2010-218855 A | 9/2010 |
| JP | 2016-081922 A | 5/2016 |
| WO | 2021/172444 A1 | 9/2021 |

OTHER PUBLICATIONS

Extended (Supplementary) European Search Report dated Aug. 24, 2023, issued in counterpart EP application No. 21778801.7. (9 pages).

Matsuno et al., "La3Ni2Sn7 Ternary Intermetallic Phase for Lithium Insertion and Deinsertion", Electrochemical and Solid-State Letters, 2005, vol. 8, No. 4, pp. A234-A236, cited in EP Extended European Search Report dated Aug. 24, 2023. (3 pages).

International Search Report dated Jun. 22, 2021, issued in counterpart application No. PCT/JP2021/013499 (2 pages).

Written Opinion dated Jun. 22, 2021, isuued in counterpart application No. PCT/JP2021/013499.

* cited by examiner

Figure 2

LITHIUM ION BATTERY

CROSS REFERENCE TO RELATED APPLICATIONS

This Application is the National Stage of International Application No. PCT/JP2021/013499, filed Mar. 30, 2021, which claims priority from Application No. 2020-066991 filed on Apr. 2, 2020 in Japan. The entire contents of these applications are incorporated herein by reference in their entirety.

TECHNICAL FIELD

The present disclosure generally relates to a lithium-ion battery which comprises a positive electrode having a positive electrode mixture layer including a positive electrode active material, and a negative electrode having a negative electrode mixture layer including a negative electrode active material, and in which charge and discharge are performed by lithium ions moving between the positive electrode and the negative electrode.

BACKGROUND ART

Lithium-ion batteries in which charge and discharge are performed by lithium ions (Li ions) moving between a negative electrode and a positive electrode are widespread. For a negative electrode active material of a negative electrode mixture layer in this lithium-ion battery, a graphite-based material is commonly used. The graphite-based negative electrode active material may be used with Si, and in this case, change in volume during charge and discharge is large, capacity maintenance characteristics are likely to deteriorate, and the cost is relatively high.

A negative electrode active material that is not graphite-based is also proposed. For example, Patent Literature 1 describes that an alloy having a $La_3Co_2Sn_7$-type crystalline structure is used as the negative electrode active material.

Although a binder is used in the negative electrode mixture layer to inhibit generation of delamination and cracking, a larger amount of binder results in decreased efficiency of a battery reaction of the negative electrode active material. Thus, there is a demand for reduction in the amount of the binder. Patent Literature 2 describes that a content of the binder is set to 0.5 mass % or more and 5.0 mass % or less.

CITATION LIST

Patent Literature

PATENT LITERATURE 1: Japanese Patent No. 4127692
PATENT LITERATURE 2: Japanese Unexamined Patent
   Application Publication No. 2007-258127

SUMMARY

Patent Literature 1 employs polyvinylidene fluoride (PVdF) as the binder; however, as a result of an experiment, it has been found that the use of an alloy having a $La_3Co_2Sn_7$-type crystalline structure as the negative electrode active material and the use of PVdF as the binder results in gelation of a mixture slurry used for forming a negative electrode mixture layer due to a reaction between both of the materials, leading to difficulty in application of the slurry. In order to reduce the reactivity between $La_3Ni_2Sn_7$ and PVdF and enable the application, the particle size of the negative electrode active material needs to be increased. However, increasing the particle size of the negative electrode active material reduces the reactivity between the negative electrode active material and Li, leading to lowered capacity.

In addition, depending on binders, the alloy having the $La_3Co_2Sn_7$-type crystalline structure causes alloying reaction to form an impurity alloy, and in this case, cycle characteristics deteriorate.

A lithium-ion battery according to the present disclosure is a lithium-ion battery, which includes a positive electrode having a positive electrode mixture layer including a positive electrode active material, and a negative electrode having a negative electrode mixture layer including a negative electrode active material, and in which charge and discharge are performed by lithium ions moving between the positive electrode and the negative electrode, wherein the negative electrode mixture layer includes a negative electrode active material represented by the general formula $M_3Me_2X_7$, wherein M includes at least one selected from the group consisting of La, Ce, Ba, Sr, Zr, Ca, Mg, and Y; Me includes at least one selected from the group consisting of Ti, V, Cr, Nb, Mn, Ni, Fe, Co, and Cu; and X includes at least one selected from the group consisting of Ge, Si, Sn, Al, P, Sb, and B, and a binder including ammonium carboxymethyl cellulose ($NH_4$—CMC).

A lithium-ion battery according to the present disclosure is a lithium-ion battery, which includes a positive electrode having a positive electrode mixture layer including a positive electrode active material, and a negative electrode having a negative electrode mixture layer including a negative electrode active material, and in which charge and discharge are performed by lithium ions moving between the positive electrode and the negative electrode, wherein the negative electrode mixture layer includes a negative electrode active material represented by the general formula $M_3Me_2X_7$, wherein M includes at least one selected from the group consisting of La, Sr, Ca, Mg, and Y; Me includes at least one selected from the group consisting of Mn, Ni, Fe, Co, and Cu; and X includes at least one selected from the group consisting of Ge, Si, Sn, Al, and B, and a binder including ammonium carboxymethyl cellulose ($NH_4$—CMC).

In the present disclosure, using a substance represented by the general formula $M_3Me_2X_7$, wherein M includes at least one selected from the group consisting of La, Ce, Ba, Sr, Zr, Ca, Mg, and Y; Me includes at least one selected from the group consisting of Ti, V, Cr, Nb, Mn, Ni, Fe, Co, and Cu; and X includes at least one selected from the group consisting of Ge, Si, Sn, Al, P, Sb, and B, such as $La_3Ni_2Sn_7$, as the negative electrode active material enables to apply the negative electrode mixture layer, and inhibits lowering of the capacity and deterioration of the cycle characteristics. In addition, using an aqueous binder enables inexpensive application.

BRIEF DESCRIPTION OF DRAWINGS

FIG. 2 is a view indicating X-ray diffraction patterns of electrodes according to Example and Comparative Examples.

DESCRIPTION OF EMBODIMENT

Hereinafter, embodiments of the present disclosure will be described based on the drawings. The present disclosure is not limited to the embodiments described herein.

Negative Electrode Material

A negative electrode material of a lithium-ion battery is preferably a material satisfying a high energy density and low expansion. Various researches and developments are underway, and proposed is use of an intermetallic compound represented by $M_3Me_2X_7$ (M=La, Ca; Me=Mn, Ni, Fe, Co; and X=Ge, Si, Sn, Al), such as $La_3Ni_2Sn_7$, as the negative electrode active material. Such an intermetallic compound, which occludes and releases Li with an intercalation reaction, has a low expansion coefficient, and is considered to achieve a longer lifetime.

This material, however, has been found to need further improvement for practical use. First, as described above, using PVdF as the binder causes gelation of the negative electrode mixture slurry, leading to difficulty in the application of the negative electrode mixture layer. Inhibiting the gelation with increasing the particle diameter of the binder may inhibit the battery reaction.

Using a binder having a cyano group, for example poly-acrylonitrile (PAN), may inhibit the gelation of the negative electrode mixture slurry. However, PAN is an organic binder, which requires an application operation using an organic solvent, and disables inexpensive application.

Furthermore, using polyimide (PI) and styrene-butadiene rubber/carboxymethyl cellulose sodium salt (SBR/Na—CMC) causes alloying reaction with the $La_3Ni_2Sn_7$-type crystalline alloy, which is the negative electrode active material, and the cycle characteristics may deteriorate.

Constitution of Embodiments

Figure 1:
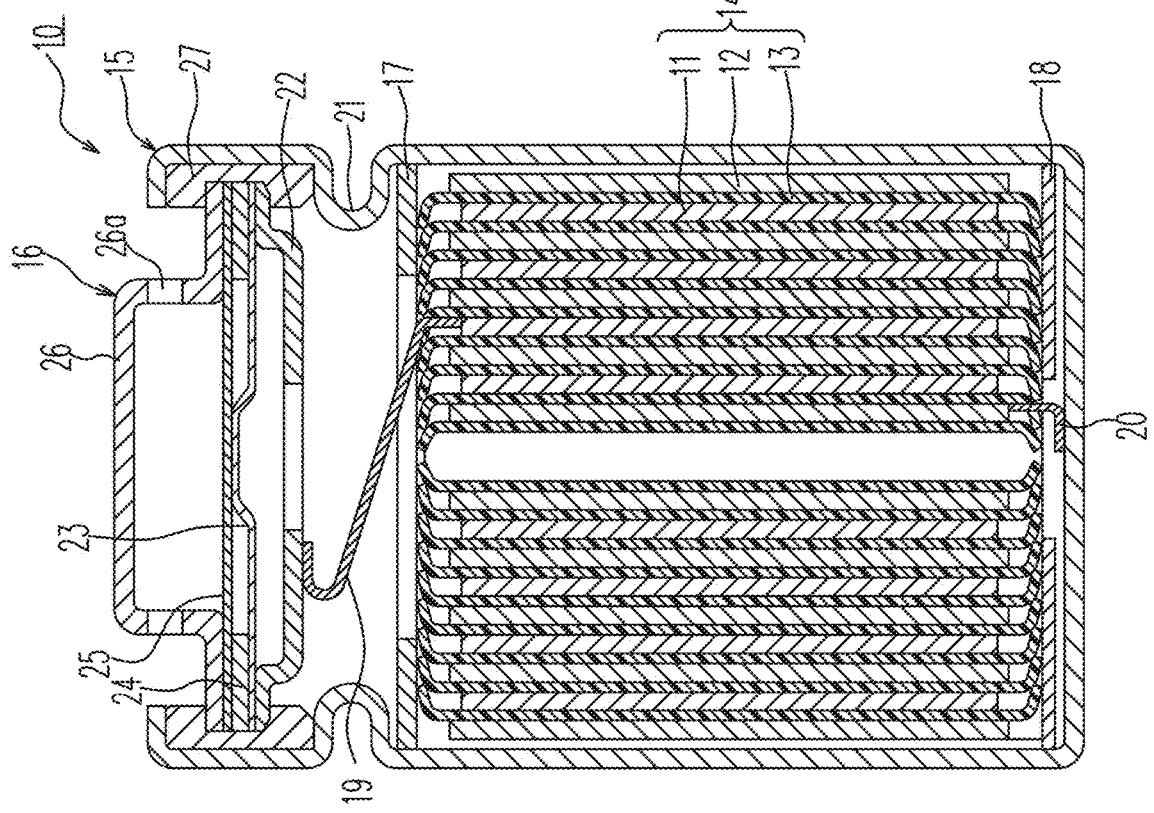
FIG. 1 is a longitudinal sectional view of a cylindrical secondary battery 10 of an example of an embodiment.

FIG. 1 is a longitudinal sectional view of a cylindrical secondary battery 10 of an example of an embodiment. In the secondary battery 10 illustrated in FIG. 1, an electrode assembly 14 and a non-aqueous electrolyte are housed in an exterior housing body 15. The electrode assembly 14 has a wound structure in which a positive electrode 11 and a negative electrode 12 are wound with a separator 13 interposed therebetween. For a non-aqueous solvent of the non-aqueous electrolyte (organic solvent), carbonates, lactones, ethers, ketones, esters, and the like may be used, and two or more of these solvents may be mixed to be used. When two or more solvents are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the non-aqueous electrolyte, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L.

Hereinafter, for convenience of description, the sealing assembly 16 side will be described as "the upper side", and the bottom side of the exterior housing body 15 will be described as "the lower side".

An opening end of the exterior housing body 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded to the lower face of a filter 22, which is a bottom plate of the sealing assembly 16. In the secondary battery 10, a cap 26, which is a top plate of the sealing assembly 16 electrically connected to the filter 22, becomes a positive electrode terminal. A negative electrode lead 20 extends through a through hole of the insulating plate 18 toward the bottom side of the exterior housing body 15, and welded to a bottom inner face of the exterior housing body 15. In the secondary battery 10, the exterior housing body 15 becomes a negative electrode terminal. When the negative electrode lead 20 is provided on the terminal end part, the negative electrode lead 20 extends through an outside of the insulating plate 18 toward the bottom side of the exterior housing body 15, and welded to the bottom inner face of the exterior housing body 15.

The exterior housing body 15 is, for example, a bottomed cylindrical metallic exterior housing can. A gasket 27 is provided between the exterior housing body 15 and the sealing assembly 16 to achieve sealability inside the secondary battery 10. The exterior housing body 15 has a grooved part 21 formed by, for example, pressing the side part thereof from the outside to support the sealing assembly 16. The grooved part 21 is preferably formed in a circular shape along a circumferential direction of the exterior housing body 15, and supports the sealing assembly 16 with the gasket 27 interposed therebetween and with the upper face of the grooved part 21.

The sealing assembly 16 has the filter 22, a lower vent member 23, an insulating member 24, an upper vent member 25, and the cap 26 which are stacked in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of central parts thereof, and the insulating member 24 is interposed between each of the circumferential parts of the vent members 23 and 25. If the internal pressure of the battery increases due to abnormal heat generation, for example, the lower vent member 23 breaks and thereby the upper vent member 25 expands toward the cap 26 side to be separated from the lower vent member 23, resulting in cutting off of an electrical connection between both the members. If the internal pressure further increases, the upper vent member 25 breaks, and gas is discharged through an opening 26a of the cap 26.

Hereinafter, the positive electrode 11, negative electrode 12, and separator 13, which constitute the electrode assembly 14, particularly the negative electrode active material constituting the negative electrode 12 will be described.

Positive Electrode

The positive electrode 11 has a positive electrode core and a positive electrode mixture layer provided on a surface of the positive electrode core. For the positive electrode core, a foil of a metal stable within a potential range of the positive electrode 11, such as aluminum, a film in which such a metal is disposed on a surface layer thereof, and the like may be used. A thickness of the positive electrode core is, for example, 10 μm to 30 μm. The positive electrode mixture layer includes a positive electrode active material, a binder, and a conductive agent, and is preferably provided on both surfaces of the positive electrode core except for a portion to which the positive electrode lead 19 is connected. The positive electrode 11 may be produced by, for example, applying a positive electrode mixture slurry including the positive electrode active material, the binder, the conductive agent, and the like on the surface of the positive electrode core, drying and subsequently compressing the applied film to form the positive electrode mixture layer on both the surfaces of the positive electrode core.

The positive electrode active material includes a lithium-transition metal oxide as a main component. The positive electrode active material may be constituted of substantially only the lithium-transition metal oxide, and particles of an inorganic compound, such as aluminum oxide and a lanthanoid-containing compound, may be adhered to a particle surface of the lithium-transition metal oxide. The lithium-transition metal oxide may be used singly, or may be used in combination of two or more thereof.

Examples of a metal element contained in the lithium-transition metal oxide include nickel (Ni), cobalt (Co), manganese (Mn), aluminum (Al), boron (B), magnesium (Mg), titanium (Ti), vanadium (V), chromium (Cr), iron (Fe), copper (Cu), zinc (Zn), gallium (Ga), strontium (Sr), zirconium (Zr), niobium (Nb), indium (In), tin (Sn), tantalum (Ta), and tungsten (W). A preferable example of the lithium-transition metal oxide is a composite oxide represented by the general formula: $Li_\alpha Ni_x M_{(1-x)} O_2$ ($0.1 \leq \alpha \leq 1.2$, $0.3 \leq x < 1$, and M includes at least one of the group consisting of Co, Mn, and Al). For the positive electrode material, NCA in which some nickel is substituted with cobalt and an aluminum is added, and the like is used, for example.

Examples of the conductive agent included in the positive electrode mixture layer may include a carbon material such as carbon black, acetylene black, Ketjenblack, carbon nanotube, carbon nanofiber, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, cellulose derivatives such as carboxymethyl cellulose (CMC) or a salt thereof, polyethylene oxide (PEO), and the like may be used in combination.

Negative Electrode

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. A thickness of the negative electrode core is, for example, 5 μm to 15 μm. The negative electrode mixture layer includes a negative electrode active material and a binder, and is preferably provided on, for example, both surfaces of the negative electrode core except for a portion to which the negative electrode lead 20 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layer on both the surfaces of the negative electrode core. A conductive agent may be added into the negative electrode mixture slurry. The conductive agent may uniform a conductive path. The negative electrode mixture layer may include a conductive agent such as acetylene black similar to that in the positive electrode mixture layer.

The negative electrode mixture layer includes, as the negative electrode active material, an intermetallic compound (a $M_3 Me_2 X_7$-type crystalline alloy) represented by the general formula $M_3 Me_2 X_7$, wherein M includes at least one of the group consisting of La and Ca; Me includes at least one of the group consisting of Mn, Ni, Fe, and Co; and X includes at least one of the group consisting of Ge, Si, Sn, and Al. Specific examples of preferable negative electrode active materials include $La_3 Co_2 Sn_7$, $La_3 Mn_2 Sn_7$, and $La_3 Ni_2 Sn_7$. Among them, $La_3 Co_2 Sn_7$ or $La_3 Ni_2 Sn_7$ is preferable, and $La_3 Ni_2 Sn_7$ is particularly preferable from the viewpoint of increase in the capacity.

A particle diameter of $M_3 Me_2 X_7$, which is the negative electrode active material, is preferably 1 to 30 μm, more preferably 2 to 20 μm, and particularly preferably 2 to 10 μm. An excessively larger particle diameter of $M_3 Me_2 X_7$ lowers reactivity with Li, and decreases a contacting area between the particles to increase the resistance. Meanwhile, an excessively smaller particle diameter is presumed to lower a filling density of the negative electrode active material to decrease the capacity. An average particle diameter of $M_3 Me_2 X_7$ is, for example, 3 to 15 μm or 5 to 10 μm. The particle diameter of $M_3 Me_2 X_7$ is measured as a diameter of a circumscribed circle of $M_3 Me_2 X_7$ particle in a cross-sectional image of the negative electrode mixture layer observed with a scanning electron microscope (SEM). The average particle diameter is calculated by averaging particle diameters of random 100 particles.

The intermetallic compound represented by $M_3 Me_2 X_7$ may be formed by ark melting, and annealing is preferably performed after the ark melting. With M, up to approximately 50% of La may be substituted. For example, with approximately 40% of La substituted with Ca, a large charge-discharge capacity (a first charge capacity of 301 mAh/g, a first discharge capacity of 223 mAh/g (1718 mAh/cc)) and a small rate of change in volume (0.5% or less) were obtained.

The negative electrode active material includes $M_3 Me_2 X_7$ as a main component (component having the highest mass ratio), and may be composed of substantially only $M_3 Me_2 X_7$. Meanwhile, for the negative electrode active material, another active material such as an intermetallic compound other than $M_3 Me_2 X_7$, a carbon-based active material such as graphite, or Si-based active material containing Si may be used in combination. When graphite is used in combination, a content of the graphite may be, for example, 50 to 90 mass % based on a mass of the negative electrode active material.

For the binder included in the negative electrode mixture layer, a binder including an aqueous ammonium carboxymethyl cellulose ($NH_4$—CMC) is used. The binder preferably further includes styrene-butadiene rubber (SBR). Aqueous binders such as aqueous urethanes and aqueous acrylic polymers may also be used.

A mass ratio of the binder to the negative electrode active material is preferably 0.3 wt % or more and 5.0 wt % or less. A ratio between $NH_4$—CMC and SBR is preferably approximately 2:0.5 to 2.

Separator

For the separator 13, a porous sheet having an ion permeation property and an insulation property is used. Specific examples of the porous sheet include a fine porous film, a woven fabric, and a nonwoven fabric. A preferable material of the separator 13 is polyolefin resins such as polyethylene and polypropylene, cellulose, and the like. The separator 13 may have any of a single-layered structure and a multilayered structure. On a surface of the separator 13, a heat-resistant layer including a heat-resistant material may be formed. Examples of the heat-resistant material may include polyamide resins such as an aliphatic polyamide and an aromatic polyamide (aramid), and polyimide resins such as a polyamideimide and a polyimide.

EXAMPLES

The present disclosure will be further described below with Examples, but the present disclosure is not limited to these Examples.

Production of Negative Electrode $La_3Ni_2Sn_7$ having a particle diameter of 2 to 20 μm was used as a negative electrode active material, SRB/CMC was used as a binder, and an artificial graphite SP5030 was used as a conductive agent. $La_3Ni_2Sn_7/NH_4$—CMC/SBR/SP5030 were mixed at a mass ratio of 85.5/3/1.5/10 to prepare a negative electrode mixture slurry. Then, the negative electrode mixture slurry was applied on a negative electrode core composed of a copper foil, the applied film was dried and compressed, and then cut to a predetermined electrode size to obtain a negative electrode. For the copper foil, a foil having a roughened surface and a thickness of approximately 18 μm may be used.

Production of Test Cell

The above negative electrode and a positive electrode composed of a lithium metal foil were disposed opposite to each other with a separator interposed therebetween to constitute an electrode assembly, and the electrode assembly was housed in an exterior housing can. A predetermined non-aqueous electrolyte liquid was injected into the exterior housing can, and then the exterior housing can was sealed to obtain a bipolar cell (non-aqueous electrolyte secondary battery).

Here, the electrolyte liquid was EC/EMC solvent into which 1.0 M of $LiPF_6$ was added as the electrolyte.

Charge-Discharge Test (Evaluation of Capacity)

The obtained test cell was charged under an environment at normal temperature at a constant current (CC) of 0.2 C until, as a battery voltage of, charge of 0.01 V (a negative electrode potential was 0.01 V with respect to the metal lithium) and discharge of 1.5 V (a negative electrode potential was 1.5 V with respect to the metal lithium) to determine a change in the electrode voltage. Then, the charge-discharge cycles in which the test cell was discharged at a constant current and charged at a constant current again were repeated to measure a charge capacity and discharge capacity at each cycle.

Results

Figure 2:
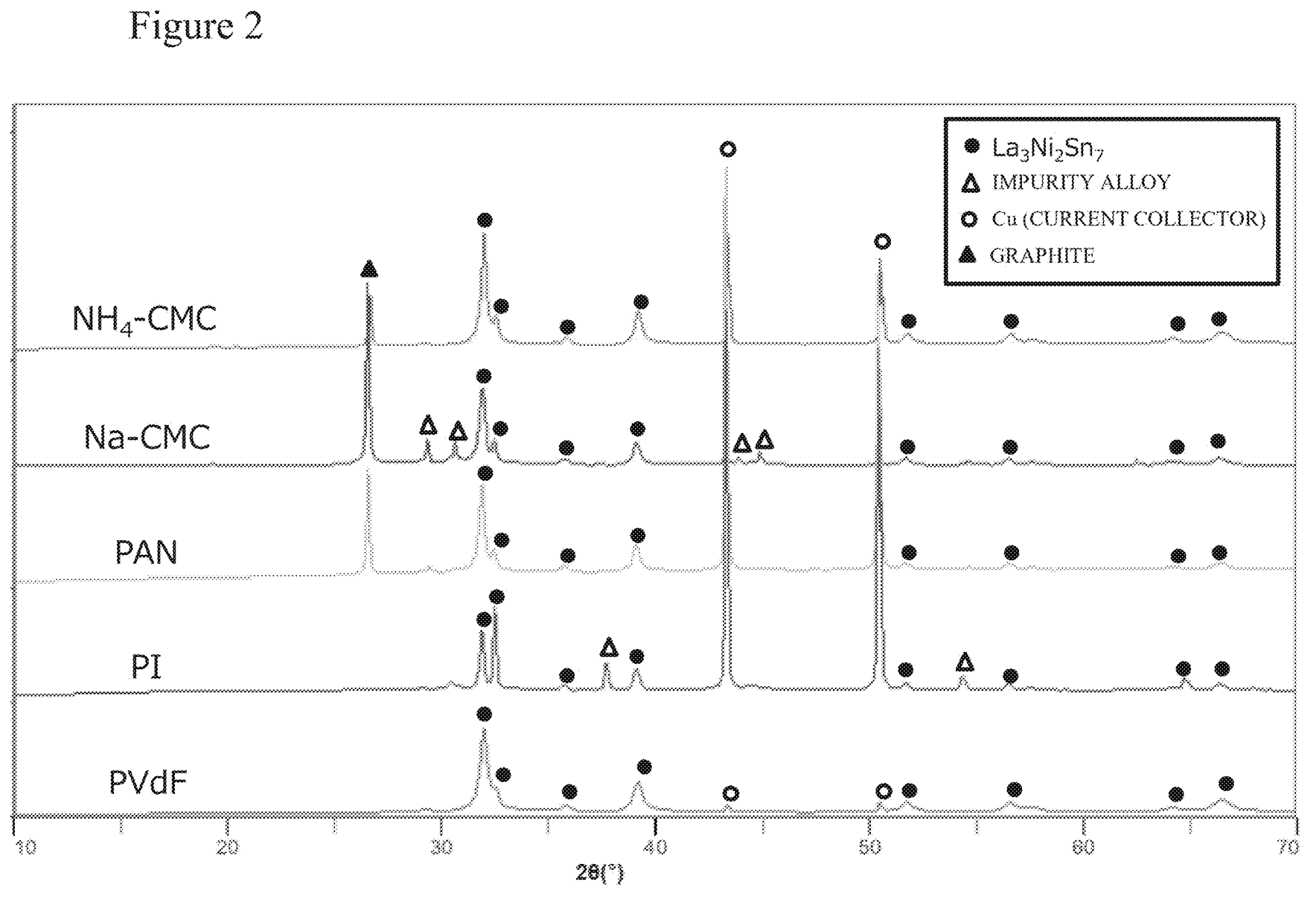

FIG. 2 shows X-ray diffraction patterns of electrodes in: Example, which uses styrene-butadiene rubber/ammonium carboxymethyl cellulose (SBR/NH₄—CMC) as the binder; Comparative Example 1, which uses styrene-butadiene rubber/sodium carboxymethyl cellulose (SBR/Na—CMC); Comparative Example 2, which uses PAN; Comparative Example 3, which uses PI; and Comparative Example 4, which uses PVdF. In the view, peaks shown as Δ are peaks of an impurity alloy (an impurity alloy generated by an unnecessary alloying reaction). As shown, Example, which uses SBR/NH₄—CMC, is found to generate no phase of the impurity alloy.

Figures 3A, 3B:
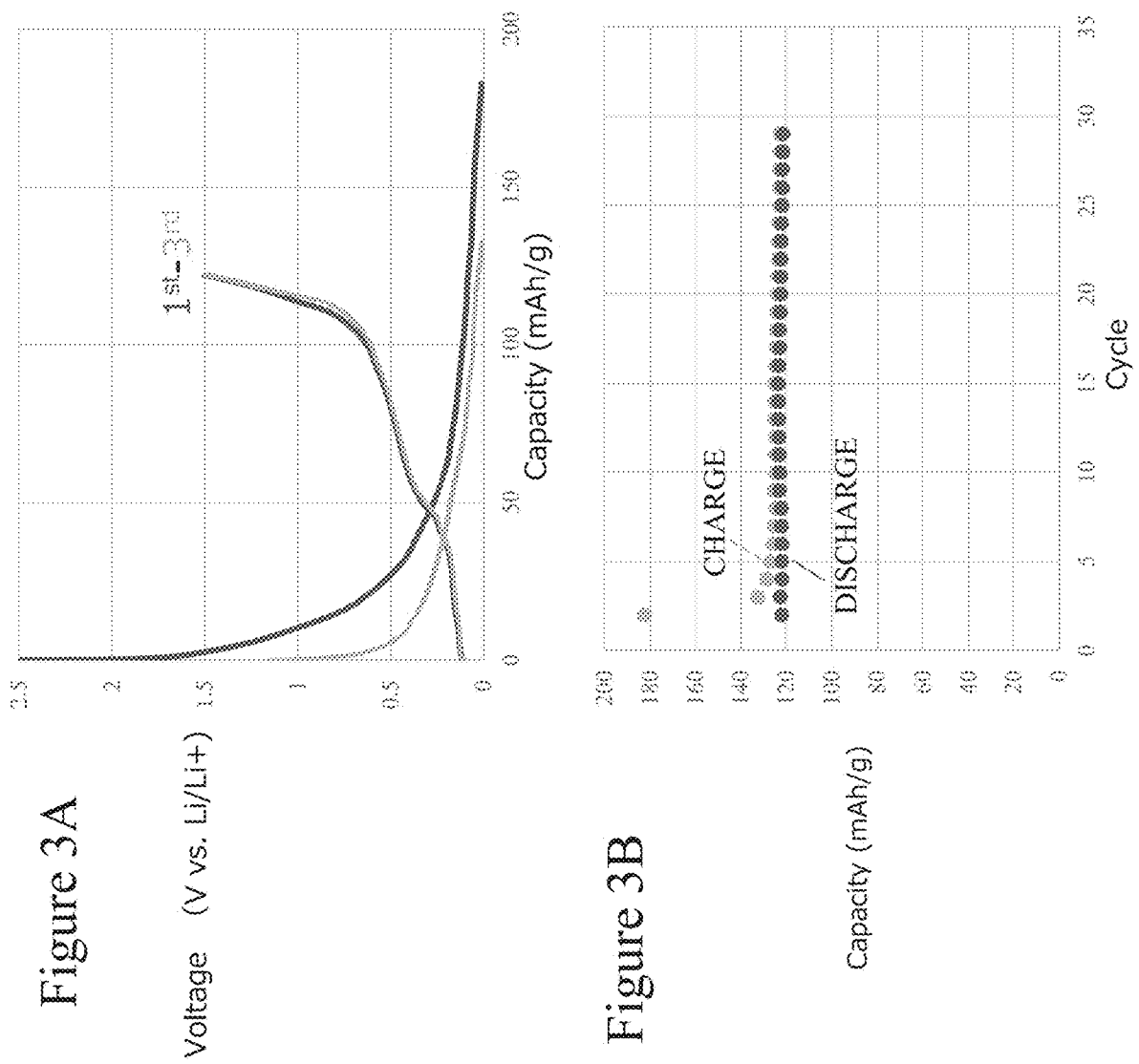
FIG. 3A is a graph indicating charge-discharge characteristics in Example, and is a view indicating a relationship between a capacity and an electrode potential.
FIG. 3B is a graph indicating charge-discharge characteristics in Example, and is a view indicating a relationship between a number of cycles and a capacity.

FIG. 3A and FIG. 3B are graphs indicating the charge-discharge characteristics in Example. FIG. 3A is a graph indicating a relationship between the capacity and the electrode potential, and FIG. 3B is a graph indicating a relationship between the number of cycles and the capacity.

As shown, in Example where SBR/NH₄—CMC is used as the negative electrode binder, almost no deterioration is found in the three times of charges and discharges. Even with 29 charge-discharge cycles, the test cell in Example has little change in the charge-discharge curve, maintains 99.5% of the initial charge-discharge capacity, and has good cycle characteristics.

Figure 4:
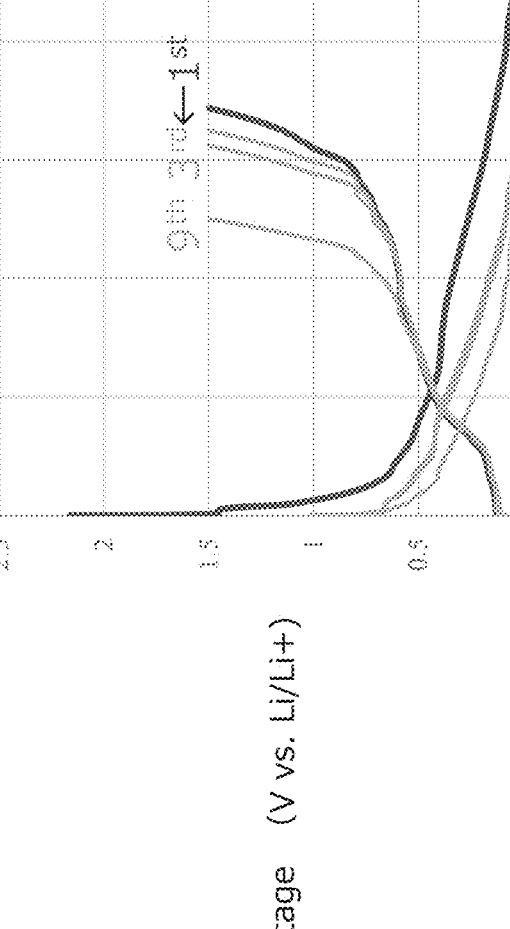
FIG. 4 is a view indicating charge-discharge characteristics in Comparative Example 1, which uses SBR/Na—CMC as the negative electrode binder.

FIG. 4 is a view indicating the charge-discharge characteristics in Comparative Example 1, which uses SBR/Na—CMC as the negative electrode binder. As shown, in Comparative Example 1, the capacity is lowered by repeating charge and discharge, and it is found to have poor cycle characteristics. This is presumably because of occurrence of the alloying reaction shown in FIG. 2.

Table 1 is a table showing evaluation of the binders with respect to each negative electrode active material of $La_3Ni_2Sn_7$ and $La_{1.8}Ca_{1.2}Ni_2Sn_7$.

TABLE 1

|  | PVdF | PAN | PI | SBR/CMC | |
|  |  |  |  | Na-CMC | NH₄-CMC |
| --- | --- | --- | --- | --- | --- |
| $La_3Ni_2Sn_7$ | $Δ^1$ | $Δ^2$ | $Δ^3$ | $Δ^3$ | ○ |
| $La_{1.8}Ca_{1.2}Ni_2Sn_7$ | $Δ^1$ | $Δ^2$ | $Δ^3$ | ↑ | ↑ |

As shown, the negative electrode mixture layer including any of $La_3Ni_2Sn_7$ and $La_{1.8}Ca_{1.2}Ni_2Sn_7$ gave the same result. That is, PVdF is likely to proceed gelation during the application, and use thereof requires being devised ($Δ^1$). The gelation during the application may be inhibited by adding maleic anhydride. PAN, which requires using an organic solvent, increases a manufacturing cost ($Δ^2$). PI and SBR/Na—CMC, which generate an alloy during the application, deteriorate the cycle characteristics ($Δ^3$). In Example, SBR/NH₄—CMC, which is aqueous and does not require an organic solvent, generates no alloy, yields the good cycle characteristics, and is preferable as the binder (O).

With the negative electrode mixture layer including the negative electrode active material represented by the general formula $M_3Me_2X_7$, wherein M includes at least one selected from the group consisting of La, Sr, Ca, Mg, and Y; Me includes at least one selected from the group consisting of Mn, Ni, Fe, Co, and Cu; and X includes at least one selected from the group consisting of Ge, Si, Sn, Al, and B, it has been confirmed that the binder including ammonium carboxymethyl cellulose (NH₄—CMC) is preferable.

As above, with the negative electrode active material represented by the general formula $M_3Me_2X_7$, wherein M includes at least one selected from the group consisting of La, Ce, Ba, Sr, Zr, Ca, Mg, and Y; Me includes at least one selected from the group consisting of Ti, V, Cr, Nb, Mn, Ni, Fe, Co, and Cu; and X includes at least one selected from the group consisting of Ge, Si, Sn, Al, P, Sb, and B, it is found that the binder including ammonium carboxymethyl cellulose ($NH_4$—CMC) is preferable.

REFERENCE SIGNS LIST

10 Secondary battery
11 Positive electrode
12 Negative electrode
13 Separator
14 Electrode assembly
15 Exterior housing body
16 Sealing assembly
17, 18 Insulating plate
19 Positive electrode lead
20 Negative electrode lead
21 Grooved part
22 Filter
23 Lower vent member
24 Insulating member
25 Upper vent member
26 Cap
26a Opening
27 Gasket

The invention claimed is:

1. A lithium-ion battery, which includes a positive electrode having a positive electrode mixture layer including a positive electrode active material, and a negative electrode having a negative electrode mixture layer including a negative electrode active material, and in which charge and discharge are performed by lithium ions moving between the positive electrode and the negative electrode, wherein the negative electrode mixture layer includes:

a negative electrode active material represented by the general formula $M_3Me_2X_7$, wherein M includes at least one selected from the group consisting of La, Ce, Ba, Sr, Zr, Ca, Mg, and Y; Me includes at least one selected from the group consisting of Ti, V, Cr, Nb, Mn, Ni, Fe, Co, and Cu; and X includes at least one selected from the group consisting of Ge, Si, Sn, Al, P, Sb, and B; and a binder including ammonium carboxymethyl cellulose ($NH_4$—CMC); and wherein the negative electrode active material consists of at least one of the group consisting of: only one or more of the $M_3Me_2X_7$ compounds, another intermetallic compound other than the one or more $M_3Me_2X_7$ compounds and one or more of the $M_3Me_2X_7$ compounds, and a Si-based active material and one or more of the $M_3Me_2X_7$ compounds.

2. A lithium-ion battery, which includes a positive electrode having a positive electrode mixture layer including a positive electrode active material, and a negative electrode having a negative electrode mixture layer including a negative electrode active material, and in which charge and discharge are performed by lithium ions moving between the positive electrode and the negative electrode, wherein the negative electrode mixture layer includes:

a negative electrode active material represented by the general formula $M_3Me_2X_7$, wherein M includes at least one selected from the group consisting of La, Sr, Ca, Mg, and Y; Me includes at least one selected from the group consisting of Mn, Ni, Fe, Co, and Cu; and X includes at least one selected from the group consisting of Ge, Si, Sn, Al, and B; and a binder including ammonium carboxymethyl cellulose ($NH_4$—CMC); and wherein the negative electrode active material consists of at least one of the group consisting of: only one or more of the $M_3Me_2X_7$ compounds, another intermetallic compound other than the one or more $M_3Me_2X_7$ compounds and one or more of the $M_3Me_2X_7$ compounds, and a Si-based active material and one or more of the $M_3Me_2X_7$ compounds.

3. The lithium-ion battery according to claim 1, further including an additional aqueous binder as the binder.

4. The lithium-ion battery according to claim 3, wherein the additional aqueous binder is styrene-butadiene rubber (SBR).

5. The lithium-ion battery according to claim 1, wherein a mass ratio of the binder to the negative electrode active material is 0.3 wt % or more and 5.0 wt % or less.

6. The lithium-ion battery according to claim 1, wherein wherein the another intermetallic compound is a negative electrode active material represented by the general formula $La_{3-\alpha}M'_\alpha Me_2X_7$, wherein M' includes at least one selected from the group consisting of Ce, Ba, Sr, Zr, Ca, Mg, and Y; Me includes at least one selected from the group consisting of Ti, V, Cr, Nb, Mn, Ni, Fe, Co, and Cu; and X includes at least one selected from the group consisting of Ge, Si, Sn, Al, P, Sb, and B, and $0<\alpha \leq 1.5$.

7. The lithium-ion battery according to claim 2, wherein wherein the another intermetallic compound is a negative electrode active material represented by the general formula $La_{3-\alpha}M'_\alpha Me_2X_7$, wherein M' includes at least one selected from the group consisting of Sr, Ca, Mg, and Y; Me includes at least one selected from the group consisting of Mn, Ni, Fe, Co, and Cu; and X includes at least one selected from the group consisting of Ge, Si, Sn, Al, and B, and $0<\alpha \leq 1.5$.

8. The lithium-ion battery according to claim 1, wherein a particle diameter of the negative electrode active material is 1 to 30 μm.

* * * * *